US008823697B2

(12) United States Patent
Woo et al.

(10) Patent No.: US 8,823,697 B2
(45) Date of Patent: Sep. 2, 2014

(54) TABLETOP, MOBILE AUGMENTED REALITY SYSTEM FOR PERSONALIZATION AND COOPERATION, AND INTERACTION METHOD USING AUGMENTED REALITY

(75) Inventors: Woon Tack Woo, Gwangju (KR); Se Won Na, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 202 days.

(21) Appl. No.: 12/867,420

(22) PCT Filed: Feb. 11, 2009

(86) PCT No.: PCT/KR2009/000627
§ 371 (c)(1),
(2), (4) Date: Aug. 12, 2010

(87) PCT Pub. No.: WO2009/102138
PCT Pub. Date: Aug. 20, 2009

(65) Prior Publication Data
US 2010/0315418 A1    Dec. 16, 2010

(30) Foreign Application Priority Data

Feb. 12, 2008    (KR) ........................ 10-2008-0012710

(51) Int. Cl.
*G06T 15/00*    (2011.01)
(52) U.S. Cl.
USPC ........................................ 345/419
(58) Field of Classification Search
USPC .................................. 345/633, 419
See application file for complete search history.

(56) References Cited

U.S. PATENT DOCUMENTS

| 2002/0167536 | A1 | 11/2002 | Valdes et al. |
| 2005/0073531 | A1* | 4/2005 | Kuroki et al. ................. 345/633 |
| 2005/0245302 | A1* | 11/2005 | Bathiche et al. ................. 463/1 |
| 2006/0038833 | A1 | 2/2006 | Mallinson et al. |
| 2006/0223635 | A1* | 10/2006 | Rosenberg ...................... 463/37 |
| 2007/0273644 | A1* | 11/2007 | Mondine Natucci ......... 345/156 |

FOREIGN PATENT DOCUMENTS

| JP | 2004-038470 A | 2/2004 |
| JP | 2007-052780 A | 3/2007 |
| KR | 1020070019849 A | 2/2007 |

OTHER PUBLICATIONS

W. Broll et al., The Virtual Round Table—a Collaborative Augmented Multi-User Environment, 2000, ACM, pp. 39-45.*
H.T. Regenbrecht et al., MagicMeeting: A Collaborative Tangible Augmented Reality System, 2002, Springer, pp. 151-166.*

(Continued)

*Primary Examiner* — Maurice L McDowell, Jr.
*Assistant Examiner* — Kyle Zhai
(74) *Attorney, Agent, or Firm* — Rothwell, Figg, Ernst & Manbeck, P.C.

(57) ABSTRACT

A tabletop, mobile augmented reality system for personalization and cooperation and an interaction method using augmented reality is presented. More particularly, the tabletop, mobile augmented reality system for personalization and cooperation adds a mobile interface for providing a personal user space to a table interface for providing a cooperative space for users such that information on a table can be brought to a personal mobile device and controlled directly or manipulated personally by a user, allows for fairness in the right to control the table, and permits users to share the result of personalization.

14 Claims, 10 Drawing Sheets

(56) References Cited

OTHER PUBLICATIONS

Y. Lee et al., Interactive Edutainment System with enhanced Personalized User Interface Framework, May 2007, IEEE, vol. 53, No. 2.*

Y. Park, The ARTable: An AR-Based Tangible User Interface System, 2006, Springer, pp. 1198-1207.*

Volkert Buchmann, Stephen Violich, Mark Billinghurst, Andy Cockburn, "FingARtips—Gesture Based Direct Manipulation in Augmented Reality", 2004, University of Canterbury.*

International Search Report for PCT/KR2009/000627 filed on Feb. 11, 2009.

Written Opinion of the International Searching Authority for PCT/KR2009/000627 filed on Feb. 11, 2009.

* cited by examiner

TABLETOP, MOBILE AUGMENTED REALITY SYSTEM FOR PERSONALIZATION AND COOPERATION, AND INTERACTION METHOD USING AUGMENTED REALITY

TECHNICAL FIELD

The present invention relates to a tabletop, mobile augmented system for personalization and cooperation and an interaction method using augmented reality. More particularly, the present invention relates to a tabletop, mobile augmented reality system for personalization and cooperation and an interaction method using augmented reality that adds a mobile interface for providing a user personal space to a table interface for providing a cooperative space for users such that information on a table can be brought to a personal mobile device and controlled directly or manipulated personally by a user, allows for fairness in the right to control the table, and permits users to share the result of personalization.

BACKGROUND ART

Augmented reality, a field of virtual reality, is implemented by a computer graphic technique that composes a virtual object in a real environment to be shown like an object existing in the original environment.

The augmented reality has a feature of complementing additional information that is difficult to obtain only in the real world by composing virtual objects on the basis of the real world, unlike the existing virtual reality that deals with virtual spaces and objects. That is, a virtual reality technology generally makes users concentrate on the virtual environment, such that the users cannot see the real environment, whereas the augmented reality technology allows users to see the real environment where the real environment and virtual objects are mixed. In other words, the virtual reality shows virtual reality to users instead of the real world, whereas the augmented reality has a difference in that it complements and shows the real world by overlapping virtual objects and the real world to the users, and has a feature of providing the users as a sense of being real, which is better than the virtual reality. For these features, the augmented reality can be applied to various real environments, and particularly, is in the spotlight as the next generation display technology that is suitable for a ubiquitous environment, unlike the existing virtual reality that is restricted only within specific fields, such as a game.

The augmented reality technology can be used for a tabletop system. A table is placed at the center of a room in a home or an office by providing a space for people to hold a discussion or play a game around the table. A tabletop system provides multilateral conference or entertainment, and a multilateral cooperative environment for education and exposition, in consideration of the above.

The earlier tabletop system had users intuitively manipulate two-dimensional information on the table with the user's hands or objects, without using the existing input devices, such as a keyboard and a mouse. A study for receiving various types of inputs by simultaneously recognizing touch of two or more fingers has been conducted; however, there is a defect in that the larger the size of a touch screen, the more the manufacturing cost increases. Meanwhile, an interaction method using physical objects that can be held by hands has been proposed; however, there is a defect in that all of the users cannot acquire the control right to simultaneously interact, because it is dependent on the number of physical objects in a multilateral environment.

Unlike desktops generally equipped with a vertical display device, the tabletop system equipped with a horizontal display device has difficulty in simultaneously showing the same content to users in several directions, because the displayed information or content is positioned slightly to one side. A study for dividing the table screen into a number of users or implementing the table screen in a circular shape so as to be turnable to the left and right, in order to remove the problems have been conducted. The former has a defect in that the larger the number of users, the smaller the divided screen, and the latter has a defect in that users have to compete for the control right to turn the circular screen.

Therefore, it is required to develop a cooperative environment that allows users to share and convert personalized results while interacting with each other, which enables the users to make personalized manipulation through direction control, and at the same time, providing a personalized interface for each user.

DISCLOSURE

Technical Problem

The present invention has been made in an effort to provide a tabletop, mobile augmented reality system for personalization and cooperation and an interaction method using augmented reality in which information on a table can be brought to a personal mobile device and controlled directly or manipulated personally by a user, allows for fairness in the right to control the table, and permits users to share and inter-cooperate the result of personalization.

Technical Solution

An exemplary embodiment of the present invention provides a tabletop, mobile augmented reality system for personalization and cooperation, including: a table interface providing a cooperative space for touching specific contents of an image projected on a table or interacting with a user through an object disposed on the specific content; and a mobile interface providing a personal space augmenting three-dimensional content on the projected image by recognizing and tracing the object.

Further, the table interface may include: an input module receiving input from a user; a scene composing module composing a scene from data transmitted from the input module; a viewer module displaying the scene composed by the scene composing module; and a network module for connection with the mobile interface.

Further, the input module may be a touch frame recognizing touch of the user.

Further, the input module may be a camera recognizing the object.

Further, the mobile interface may include: a tracing module recognizing and tracing objects; a network module for connection with the table interface; a registration module augmenting an image transmitted from the trace module with three-dimensional content; and a viewer module displaying an image augmented by the registration module.

Further, the trace module may include a camera.

Further, the mobile interface may further include an input module for interaction with the three-dimensional content.

Further, the input module may include a touch panel.

Further, the object may have the same coordinate values in the table interface and the mobile interface.

Further, the table interface and the mobile interface may exchange and transmit coordinate data of the object by networking, and the transmission may be performed in temporal synchronization.

Another exemplary embodiment of the present invention provides an interaction method using augmented reality, including: (a) disposing an object onto a table interface; (b) recognizing and tracing the object with a camera equipped in the mobile interface; (c) augmenting an image acquired by the camera with three-dimensional content; and (d) performing interaction by selecting or manipulating three-dimensional content.

The interaction method using augmented reality may further include manipulating the object on the table interface.

The interaction method using augmented reality may further comprising recognizing the object on the table interface by using a touch panel.

Advantageous Effects

According to the exemplary embodiments of the present invention, it is possible to allow for personalized manipulation by providing an interface that is personalized for each user to be directly controlled by the user, and simultaneously provide a personal space and a cooperative space by allowing the users to share the manipulated results and work in cooperation with each other.

Further, according to the exemplary embodiments of the present invention, it is possible to intuitively manipulate two-dimensional information on a table by recognizing the user's hands and objects through a table interface, without using input devices of the related art, such as a keyboard and a mouse.

Further, according to the exemplary embodiments of the present invention, it is possible to allow a plurality of users to use table interfaces with equal right to control, and provide a user with convenience by expanding a visible distance.

BEST MODE

The mobile augmented reality system for personalization and cooperation according to the present invention includes: a table interface providing a cooperative space for touching specific contents of an image projected on a table or interacting with a user through an object disposed on the specific content; and a mobile interface providing a personal space augmenting three-dimensional content on the projected image by recognizing and tracing the object.

MODE FOR INVENTION

Hereinafter, exemplary embodiments of the present invention will be described in detail with reference to the accompanying drawings. First of all, it is to be noted that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the exemplary embodiment of the present invention will be described, but it will be understood to those skilled in the art that the spirit and scope of the present invention are not limited thereto and various modifications and changes can be made.

Figure 1:
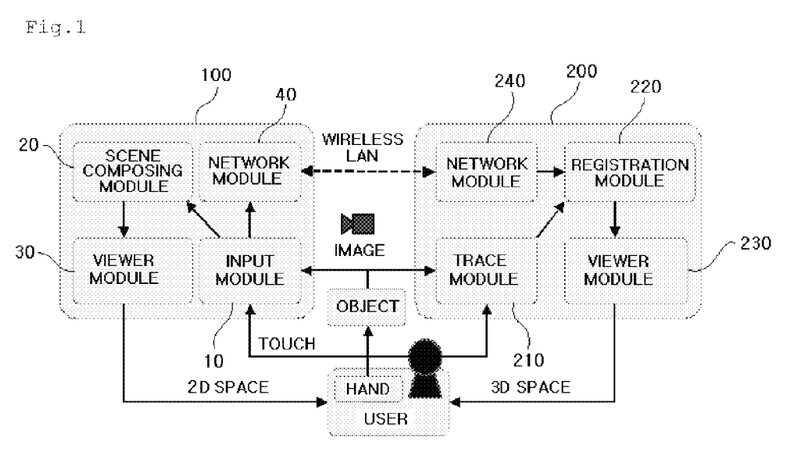
FIG. 1 is a configuration diagram of an augmented reality system for personalization and cooperation according to an exemplary embodiment of the present invention.

FIG. 1 is a configuration diagram of a tabletop, mobile augmented reality system for personalization and cooperation according to an exemplary embodiment of the present invention.

Referring to FIG. 1, the tabletop, mobile augmented reality system for personalization and cooperation according to an exemplary embodiment of the present invention (hereinafter, "augmented reality system") includes a table interface 100 and a mobile interface 200.

The table interface 100 provides a cooperative space for touch of a specific piece of content of an image projected on a table or interaction with a user through an object disposed on a specific piece of content. The 'object' includes a marker and a tangible object and functions as a medium of augmentation.

The table interface 100 includes an input module 10, a scene composing module 20, a viewer module 30, and a network module 40.

The input module 10, a component for receiving input from a user, includes a touch frame recognizing touch of a user and a camera recognizing an object.

The scene composing module 20 is a component that composes a scene from data transmitted from the input module 10.

The viewer module 30 is a component that display a scene composed by the scene composing module 20.

The network module 40 is a component for connection with a mobile interface 200. For example, the network module 40 of the table interface 100 is wirelessly connected with a network module 240 of the mobile interface 200 and can communicate through TCP/IP connection.

The mobile interface 200 provides a personal space that recognizes and traces an object to augment three-dimensional content. The mobile interface 200 increases accessibility to the table interface 100 by applying the augment reality technology and makes it possible to easily see the augmented three-dimensional content. The user is able to interact with a three-dimensional space by using the mobile interface 200, without using a keyboard or a mouse. The mobile interface 200 provides the user with a personalized interface and expands the visible distance of the user. Further, the mobile interface 200 allows the user to have equal control right, wherever the user is. Therefore, the mobile interface 200 removes the problem, as described above, that the larger the number of users, the more the divided screen decreases, when the table screen is divided into the number of users, or the users have to compete for the control right to turn the circular screen, when the table screen is implemented in a circular shape to be turned to the left and right.

The mobile interface 200 includes a trace module 210 that recognizes and traces an object with a camera, a registration module 220 that augments an image transmitted from the trace module 210 with three-dimensional content, a viewer module 230 that displays the image augmented by the registration module 220, and a network module 240 for connection with the table interface 100. Though not shown, the mobile interface 200 may further include an input module for interaction with the three-dimensional content.

Figure 2:
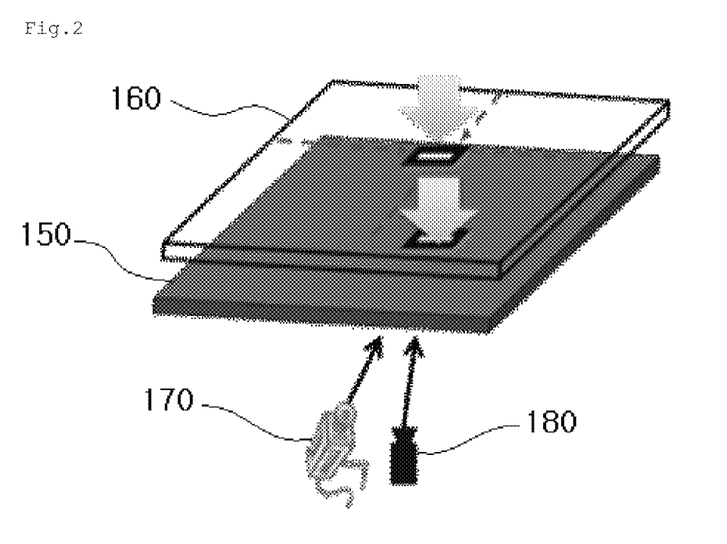
FIG. 2 is a conceptual diagram of a table interface.

FIG. 2 is a conceptual diagram of the table interface.

The table interface functions as a cooperative environment for common users. A plurality of users can select virtual content by manipulating the virtual content on the table 150 or disposing an object on the content with their hands in a cooperative space. The arrow indicates an object in FIG. 2. In this configuration, the user's hands or the object is recognized and traced by a touch frame 160 and a camera 180 under the table 150. A projector 170 projects a two-dimensional image of the virtual space onto the table 150. For example, the projector 170 projects a two-dimensional map of the virtual space onto the surface of the table 150 such that the user, who is exploring, can easily locate himself/herself throughout the entire virtual space, and provides appropriate feedback, when the user moves, in order to implement virtual space navigation.

The touch frame generally detects the position of one object at one time; therefore, it is difficult to calculate an accurate position, when a second object is disposed after one object is disposed on the table. Accordingly, the touch frame 160 may be spaced at a predetermined distance from the surface of the table 150. In this case, it is possible to detect that an object marker is disposed on or removed from the table and the object previously disposed does not interfere with detection of the next object, even if two or more objects are disposed on the table. Therefore, several users can simultaneously dispose their objects onto the table 150 and the objects are connected with content that the table interface displays. When an object is disposed on the table 150, the camera 180 under the table 150 traces the type and position of the object, such that it is possible to accurately trace them, even if users simultaneously move several objects.

Figure 3:
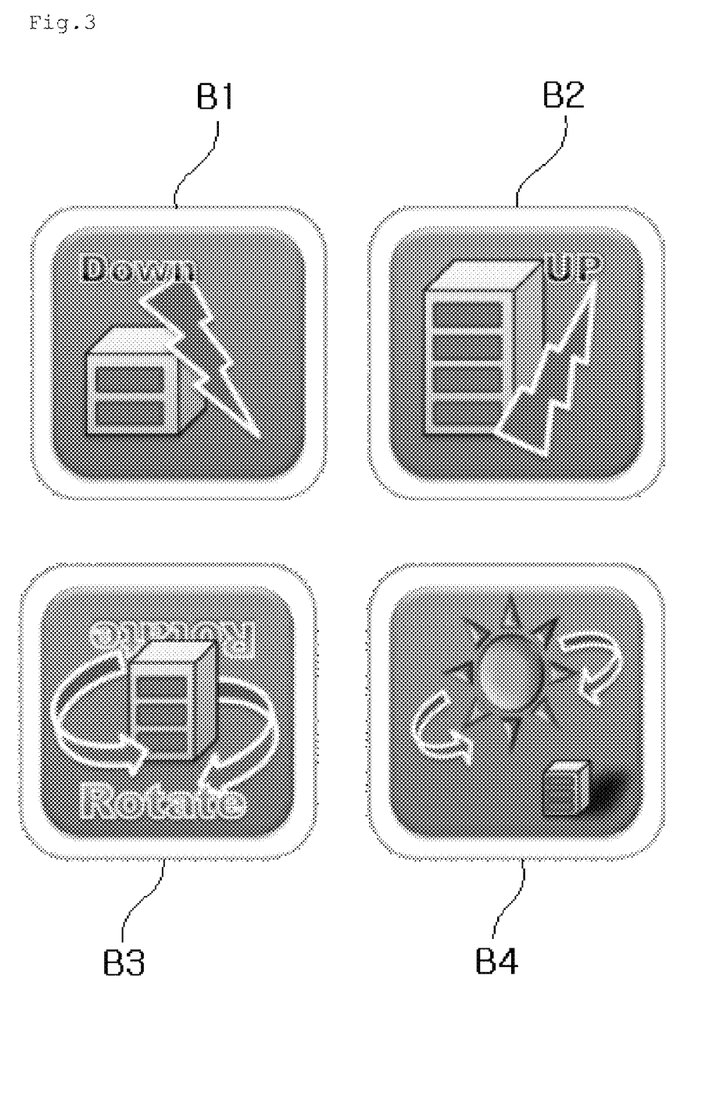
FIG. 3 is a diagram showing an example of buttons in a table interface.

FIG. 3 is a diagram showing an example of buttons in a table interface.

The table interface may be provided with buttons B1-B4 to easily manipulate displayed content. For example, when a height decrease button B1 is touched, the height of a building that is virtual content decreases, and when a height increase button B2 is touched, the opposite operation to the height decrease button B1 is performed. Further, when a turn button B3 is touched, the building turns to the left and right. The buttons may be implemented by simple selection type buttons that are suitable for one-time operation, such as creating or deleting content, and hand gesture recognition-based buttons that are suitable for motion consistently making changes, such as changes in position or shape of content, by changing the properties of content in accordance with movement of the hands.

Figure 4:
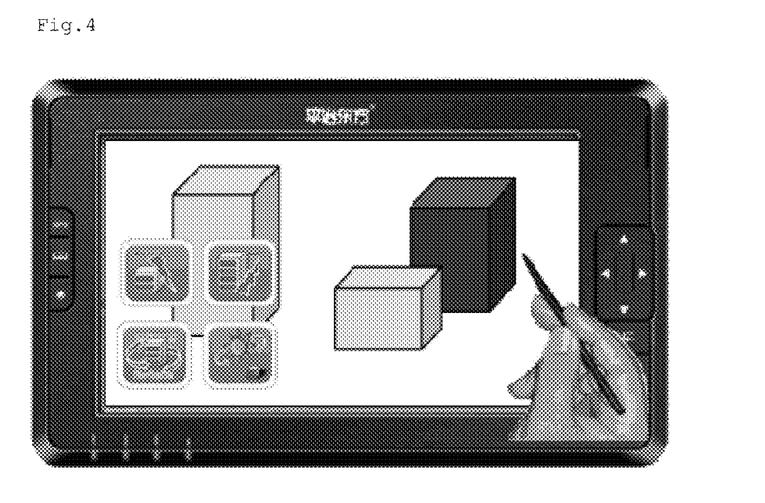
FIG. 4 is a conceptual diagram of a mobile interface.
Figure 5:
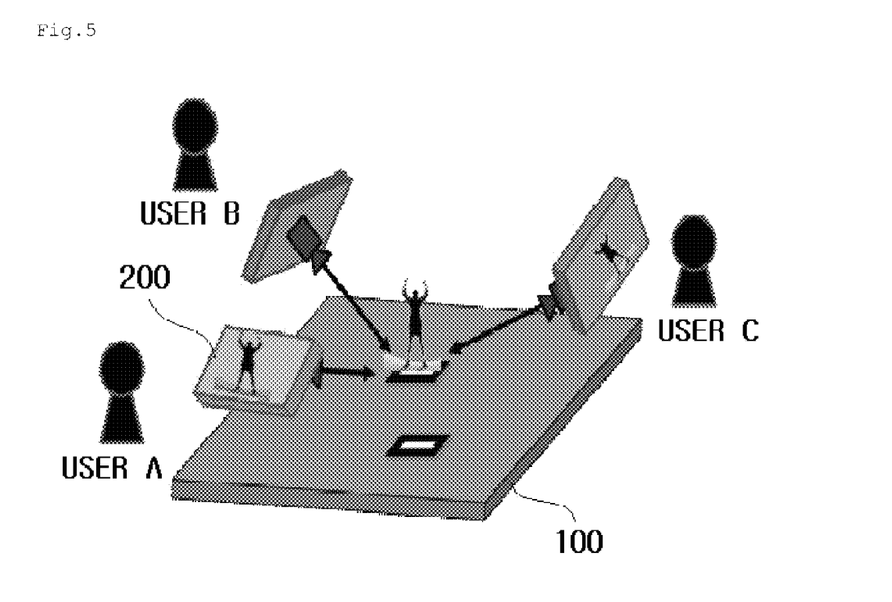
FIG. 5 is a conceptual diagram illustrating interaction among users, a mobile interface, and a table interface.

FIG. 4 is a conceptual diagram of a mobile interface and FIG. 5 is a conceptual diagram illustrating interaction among users, a mobile interface, and a table interface.

The mobile interface 200 provides a user with an image augmented with an object of the table interface 100 and the user performs additional manipulation, using an input module of the mobile interface 200 and transmits it to the table interface 100, thereby performing interaction with three-dimensional content. In this process, the manipulation of the user is transmitted from the network module 240 of the mobile interface 200 to the network module 40 of the table interface 100. For this purpose, the input module of the mobile interface 200 may be provided with a touch panel to select or manipulate three-dimensional content. Referring to FIG. 4, the same or similar buttons to those on the table interface (see FIG. 3) is provided on the touch panel of the mobile interface 200. A user can increase or decrease the height of a specific building and turn the building, using the buttons, and these manipulated results can be reflected by the table interface. Further, a laser-tracing technique may be used in the mobile interface 200 to use three-dimensional content.

An object on the table is simultaneously recognized and traced by the table interface 100 and the mobile interface 200. The mobile interface 200 traces an object, using the camera, which is used to calculate relative three-dimensional posture of the mobile interface 200. The mobile interface 200 registers a real image inputted from the camera with three-dimensional content and displays it. When users access the table interface 100, which is a cooperative space, through the mobile interface 200, the users can see the entire table interface 100, regardless of their positions relative to the table interface 100, such that the visible distance expands. Further, the users have equal control right for the content on the table interface 100, regardless of their positions relative to the table interface 100. For example, as show in FIG. 5, when users A, B, and C perform a common function in the table interface 100, using each mobile interface 200, different information is displayed on the mobile interfaces 200 in accordance with the camera positions and angles of the mobile interfaces 200. Further, the results of manipulating three-dimensional content through the mobile interfaces 200 by the users are reflected by the table interface 100, which is a cooperative space.

Figure 6:
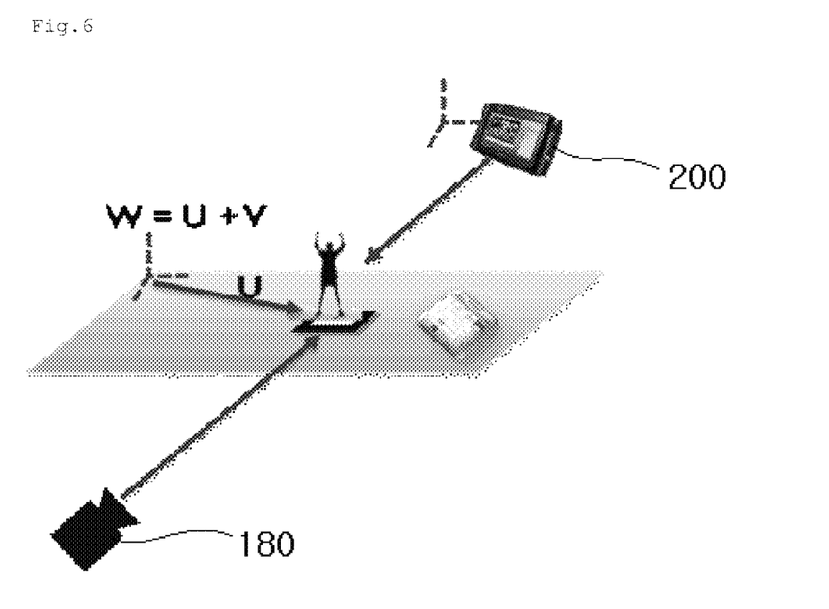
FIG. 6 is a conceptual diagram illustrating forming a common space by matching a spatial coordinate system of a table interface and a mobile interface.
Figure 7:
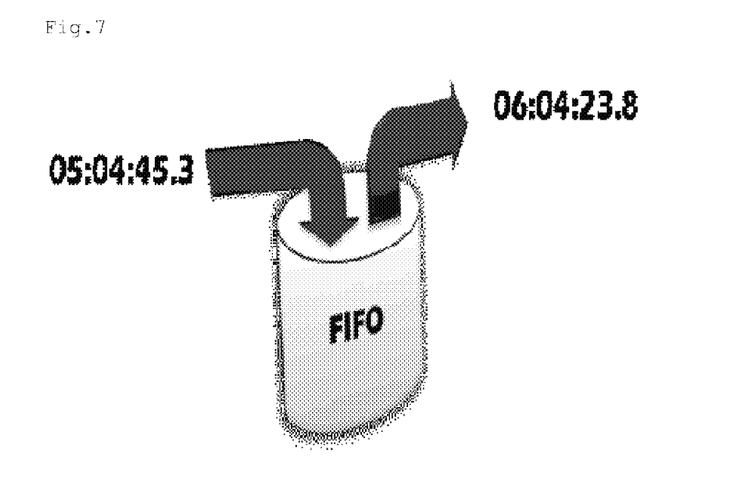
FIG. 7 is a conceptual diagram illustrating forming a common space by temporal synchronization of a table interface and a spatial coordinate system of a mobile interface.

FIG. 6 is a conceptual diagram illustrating forming a common space by matching a spatial coordinate system of a table interface and a mobile interface and FIG. 7 is a conceptual diagram illustrating forming a common space by temporal synchronization of a table interface and a spatial coordinate system of a mobile interface.

The augmented reality system according to the present invention provides a common space so that a user does not feel a difference between the table interface and the mobile interface, that is, the user feels as if the two interfaces are one unit. For this purpose, the augmented reality system matches spatial coordinate system of the two interfaces and provides temporarily synchronized and sharing of standardized data.

Referring to FIG. 6, a physical object disposed on the table functions not only as a medium for augmenting three-dimensional content, but as a medium for registering spatial coordinates of two interfaces.

In order to register the spatial coordinates of two interfaces, three-dimensional absolute coordinates are acquired first by combining the three-dimensional relative coordinates of an object relating to the coordinate system of the mobile interface with the two-dimensional absolute coordinates of the object disposed on the table interface. In FIG. 6, "u" designates the two-dimensional absolute coordinates of an object in a table interface, "v" designates the three-dimensional relative coordinates in the mobile interface, and "w" designates the three-dimensional absolute coordinates of an object which is calculated from "u" and "v". The mobile interface and the table interface exchange coordinate data by networking.

It is preferable that data is transmitted under temporal synchronization to prevent data stagnation due to data flooding or delay in transmission when exchanging the coordinate data. For example, the temporal synchronization may be performed by making data in a series in a pipe type, such as FIFO and then controlling the data, as shown in FIG. 7. This structure functions as a filter that filters overdue data or unnecessary data.

Figure 8:
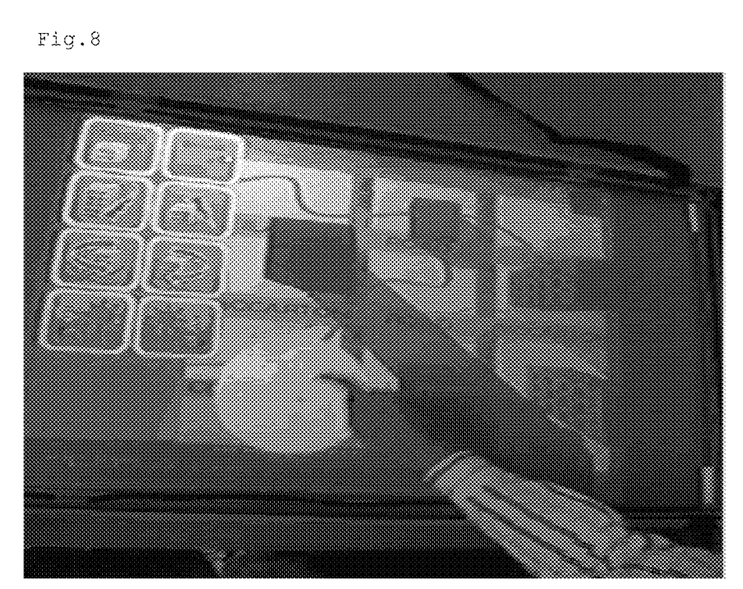
FIGS. 8 and 9 are photographs showing an example of a table interface.
Figure 9:
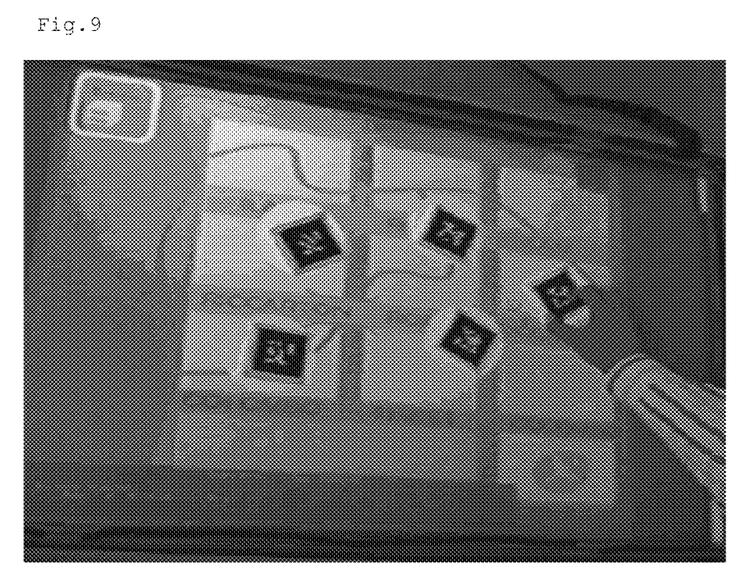

FIGS. 8 and 9 are photographs showing an example of a table interface.

The table interface includes two types of input modules.

Referring to FIG. 8, the table interface may be provided with a hand trace device using a touch frame. A user can intuitively select or manipulate three-dimensional content or a button on the table interface with his/her fingers. The white circle shown in FIG. 8 indicates the position that the current user clicks with a finger.

Referring to FIG. 9, the table interface may be provided with a camera for recognizing and tracing an object on the table. The user may dispose an object to select virtual three-dimensional content displayed on the table interface. When a plurality of objects is disposed, as shown in FIG. 9, the table interface can simultaneously recognize the objects.

Figure 10:
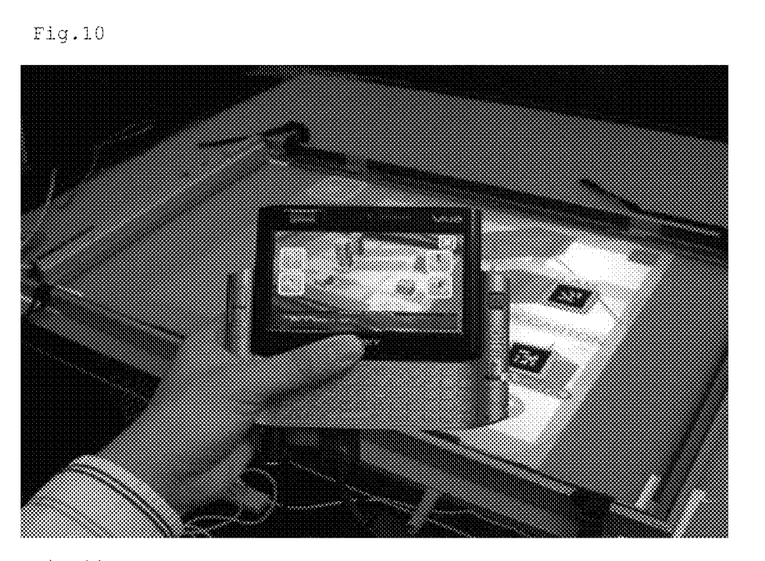
FIG. 10 is a photograph when a user sees a table around the table with a mobile device.

FIG. 10 is a photograph when a user sees a table around the table with a mobile device. As shown in FIG. 10, a user can see or interact with the virtual content with other hand while a mobile device is in the other hand.

Figure 11:
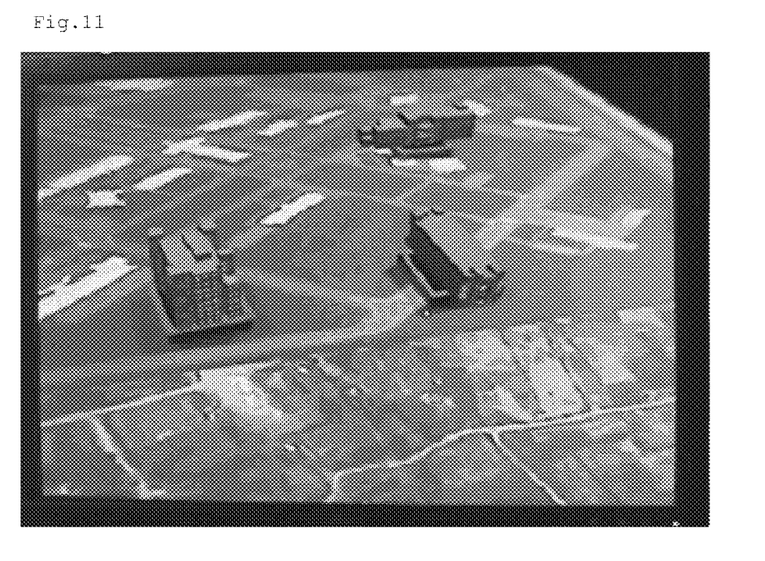
FIGS. 11 and 15 are photographs showing an example of a mobile interface.
Figure 15:
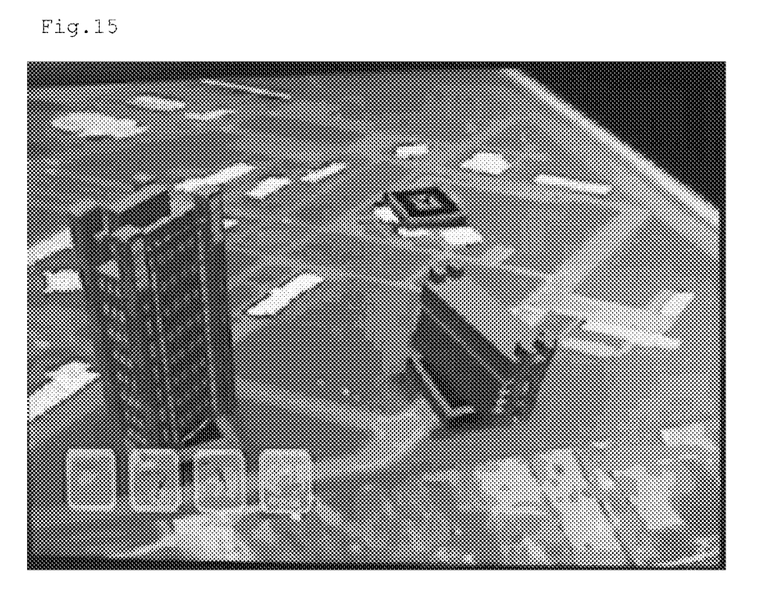

FIGS. 11 and 15 are photographs showing an example of a mobile interface.

The input module of the mobile interface may be implemented by a touch panel. The user is able to select and manipulate three-dimensional content by touching the touch panel of the mobile interface.

Figure 12:
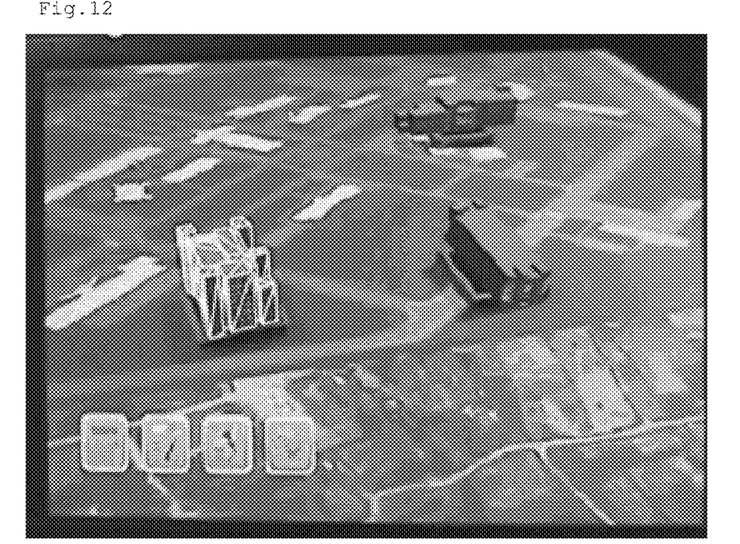
Figure 13:
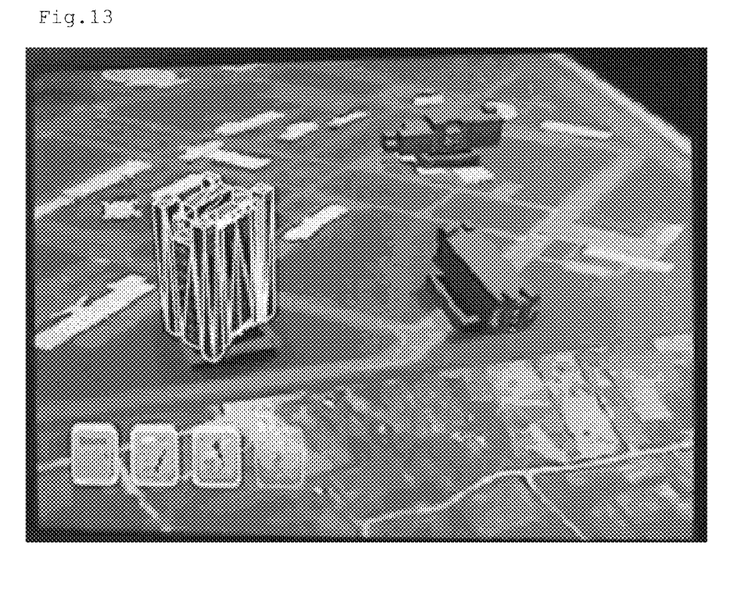
Figure 14:
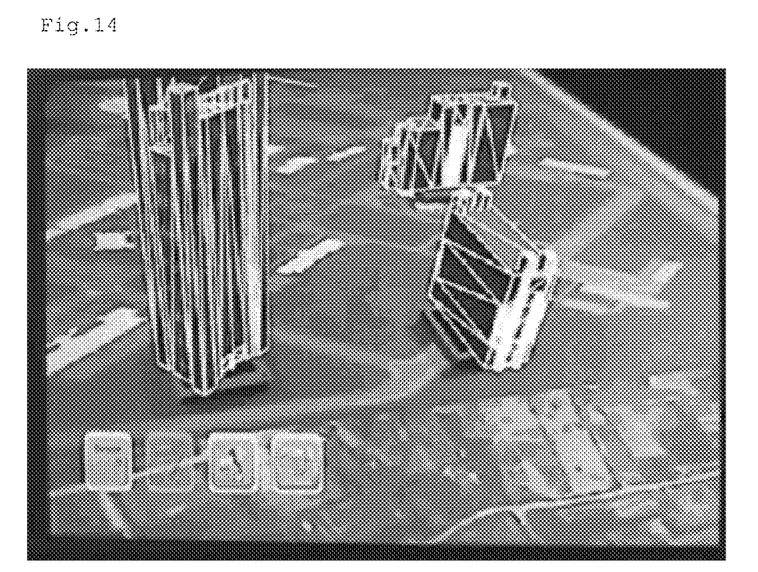

The user can see a registered image through the mobile interface by disposing objects, such as a tangible object, at a predetermined position on the table interface and augmenting three-dimensional virtual content corresponding to the objects (see FIG. 11). When the user selects the three-dimensional content, the virtual content is indicated by a white line to discriminate the selected virtual content (see FIG. 12). Further, when content is selected, buttons are displayed under the virtual content such that the user is able to see other manipulation means of the selected content. When the height increase button in the buttons is touched, the height of a building that is the virtual content increases, and when the turn button is touched, the building turns to the left and right (see FIG. 13). On the other hand, it is possible to select and manipulate at one time several three-dimensional contents (see FIG. 14), and remove the contents, using the delete button (see FIG. 15).

Figure 16:
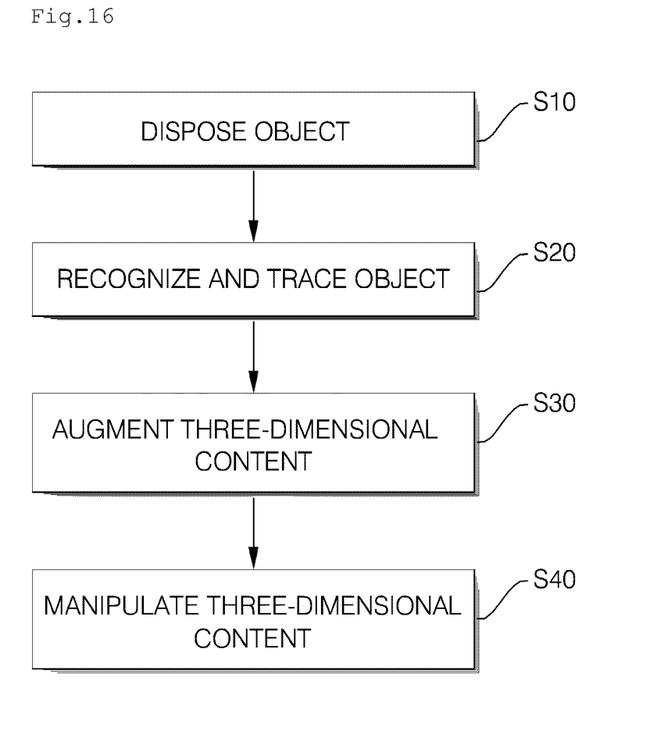
FIG. 16 is a flowchart illustrating an interaction method using an augmented reality according to an exemplary embodiment of the present invention.

FIG. 16 is a flowchart illustrating an interaction method using an augmented reality according to an exemplary embodiment of the present invention.

An interaction method using augmented reality according to an exemplary embodiment of the present invention, as shown in FIG. 16, includes disposing an object (S10), recognizing and tracing an object (S20), augmenting three-dimensional content (S30), and manipulating three-dimensional content (S40). Though not shown, the interaction method using augmented reality may further include manipulating an object on the table interface.

S10 is a step of disposing an object onto the table interface. A user disposes a marker or a tangible object at a desired position.

S20 is a step of recognizing and tracing an object with a camera equipped in the mobile interface.

S30 is a step of augmenting an image acquired by the camera with three-dimensional content. The user can see three-dimensional content registered with the video acquired by the camera through the mobile interface.

S40 is a step of performing interaction by selecting or manipulating three-dimensional content. The user selects and manipulates three-dimensional content by touching button in the mobile interface and the manipulated result is reflected by the table interface.

Meanwhile, in addition to selecting and manipulating three-dimensional content through the mobile interface, it is possible to select and manipulate three-dimensional content through the table interface, which was described above with reference to FIGS. 8 and 9.

The spirit of the present invention has just been exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the appended claims and it should be analyzed that all spirits within a scope equivalent thereto are included in the appended claims of the present invention.

INDUSTRIAL APPLICABILITY

The present invention can be applied to various fields, such as education, practice, and entertainment, as well as town planning, by adding a personal interface to a mobile interface as a cooperative space through a table interface.

SEQUENCE LIST TEXT

10: Input module
20: Scene composing module
30, 230: Viewer module
40, 240: Network module
100: Table interface
200: Mobile interface
210: Trace module
220: Registration module

The invention claimed is:

1. A mobile interface apparatus, cooperating with a table top interface apparatus, for providing an augmented reality, comprising:
   a camera module;
   a display module;
   a communication module communicating with the table top interface apparatus, wherein the table top interface apparatus comprises a table top display device providing a cooperative space on which at least one real object is disposed; and
   a control module configured to:
   detect, via the camera module, position information and orientation information of the real object,
   display, via the display module, an image of a virtual object onto the real object according to the position information and the orientation information, wherein the table top interface apparatus displays, via the table top display device, an image of a background scene related to the virtual object on the cooperative space, receive, via the communication module, manipulation information being used for modifying the virtual object from the table top interface apparatus, and adjusting the image of the virtual object based on the manipulation information, wherein the table top interface apparatus modifies the image of the background scene considering the adjusted image of the virtual object, wherein a spatial coordinate system of the mobile interface apparatus and a spatial coordinate system of the table top interface apparatus are matched by exchanging coordinate data of the real object between the mobile interface apparatus and the table top interface apparatus under temporal synchronization.

2. The apparatus of claim 1, wherein the manipulation information includes at least one of size information, height information and rotation information of the virtual object.

3. The apparatus of claim 1, wherein the control module displays, via the display module, the image of the virtual object at a specific view point determined based on the orientation information, and wherein the control module performs at least one of a size change, a height change and a rotation of the displayed image of the virtual object based on the manipulation information.

4. The apparatus of claim 1, wherein the table top display device is a touch display panel receiving a touch input on the cooperative space from a user, and wherein the table top interface apparatus displays, via the touch display panel, at least one soft key on the cooperative space and obtains the manipulation information based on the touch input to the soft key.

5. The apparatus of claim 1, wherein the table top interface apparatus further comprises a camera detecting a touch gesture on the cooperative space from a user, and wherein the table top interface apparatus displays, via the table top display device, at least one soft key on the cooperative space and obtains the manipulation information based on the touch gesture to the soft key.

6. The apparatus of claim 1, wherein the virtual object is a building and the background scene is a map.

7. A method for providing an augmented reality, performed in a mobile interface apparatus cooperating with a table top interface apparatus, comprising:
   detecting position information and orientation information of at least one real object, wherein the real object is disposed on a cooperative space provided by a table top display device of the table top interface apparatus;
   displaying an image of a virtual object onto the real object according to the position information and the orientation information, wherein the table top apparatus displays, via the table top display device, an image of a background scene related to the virtual object on the cooperative space;
   receiving manipulation information being used for modifying the virtual object from the table top interface apparatus; and
   adjusting the image of the virtual object based on the manipulation information, wherein the table top interface apparatus modifies the image of the background scene considering the adjusted image of the virtual object,
   wherein a spatial coordinate system of the mobile interface apparatus and a spatial coordinate system of the table top interface apparatus are matched by exchanging coordinate data of the real object between the mobile interface apparatus and the table top interface apparatus under temporal synchronization.

8. The method of claim 7, wherein the manipulation information includes at least one of a size information, a height information and a rotation information of the virtual object.

9. The method of claim 7, wherein the table top display device is a touch display panel receiving a touch input on the cooperative space from a user, and wherein the table top interface apparatus displays, via the touch display panel, at least one soft key on the cooperative space and obtains the manipulation information based on the touch input to the soft key.

10. The method of claim 7, wherein the table top interface apparatus further comprises a camera detecting a touch gesture on the cooperative space from a user, and wherein the table top interface apparatus displays, via the table top display device, at least one soft key on the cooperative space and obtains the manipulation information based on the touch gesture to the soft key.

11. A table top interface apparatus, cooperating with at least one mobile interface apparatus, for providing an augmented reality, comprising:
   a table top display panel providing a cooperative space on which at least one real object is disposed;
   a communication module communicating with the at least one mobile interface apparatus, wherein the at least one mobile interface apparatus detects position information and orientation information of the real object and displays an augmented image including an image of a virtual object onto the real object based on the position information and orientation information; and
   a control module configured to:
   display, via the table top display panel, an image of a background scene related to the virtual object on the cooperative space,
   obtain manipulation information being used for modifying the virtual object;
   transmit, via the communication module, the manipulation information to the at least one mobile interface apparatus, wherein the at least one mobile interface apparatus adjusts the image of the virtual object based on the manipulation information, and
   modifying the image of the background scene considering the adjusted image of the virtual object,
   wherein a spatial coordinate system of the mobile interface apparatus and a spatial coordinate system of the table top interface apparatus are matched by exchanging coordinate data of the real object between the mobile interface apparatus and the table top interface apparatus under temporal synchronization.

12. The apparatus of claim 11, wherein the manipulation information includes at least one of size information, height information and an rotation information of the virtual object.

13. The apparatus of claim 11, wherein the table top display panel is a touch display panel receiving a touch input on the cooperative space from a user, and wherein the at least one mobile interface apparatus displays, via the touch display panel, at least one soft key on the cooperative space and obtains the manipulation information based on the touch input to the soft key.

14. The apparatus of claim 11, wherein the control module receives, via the communication module, the manipulation information from one of the at least one mobile interface apparatus.

* * * * *